(12) United States Patent
Higashimata et al.

(10) Patent No.: US 6,415,217 B1
(45) Date of Patent: Jul. 2, 2002

(54) VEHICULAR VELOCITY CONTROLLING APPARATUS AND METHOD TO FOLLOW UP A PRECEDING VEHICLE RUNNING AHEAD OF VEHICLE

(75) Inventors: Akira Higashimata; Takenori Hashizume, both of Kanagawa; Kazutaka Adachi, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/592,567

(22) Filed: Jun. 12, 2000

(30) Foreign Application Priority Data

Jun. 15, 1999 (JP) .......................................... 11-168266

(51) Int. Cl.[7] .............................. B60T 8/32; B60T 7/12; B60T 7/16; G05D 1/00
(52) U.S. Cl. ............................. 701/96; 701/93; 180/69; 180/170; 180/171; 340/903; 340/435; 340/436; 342/69; 342/70
(58) Field of Search ...................... 701/93, 96; 180/169, 180/170, 171; 340/903, 435, 436; 382/69, 70

(56) References Cited

U.S. PATENT DOCUMENTS

| | | | |
|---|---|---|---|
| 5,382,206 A | | 1/1995 | Oda et al. .................... 477/108 |
| 5,396,426 A | * | 3/1995 | Hibino et al. ................. 701/96 |
| 5,529,139 A | * | 6/1996 | Kurahashi et al. ........... 180/169 |
| 5,934,399 A | * | 8/1999 | Iiboshi et al. ............... 180/169 |
| 5,959,572 A | * | 9/1999 | Higashimata et al. ......... 342/70 |
| 6,154,168 A | * | 11/2000 | Egawa et al. ................. 342/71 |
| 6,161,073 A | * | 12/2000 | Tange et al. .................. 701/96 |
| 6,175,799 B1 | * | 1/2001 | Tsutsumi et al. ............. 701/96 |
| 6,188,950 B1 | * | 2/2001 | Tsutsumi et al. ............. 701/96 |
| 6,223,117 B1 | * | 4/2001 | Labuhn et al. ................ 701/93 |
| 6,233,516 B1 | * | 5/2001 | Egawa ......................... 701/96 |
| 6,259,395 B1 | * | 7/2001 | Adachi et al. ............... 340/903 |
| 6,269,298 B1 | * | 7/2001 | Seto ............................ 342/69 |
| 6,298,298 B1 | * | 10/2001 | Tange et al. ................ 340/435 |
| 6,330,507 B1 | * | 12/2001 | Adachi et al. ............... 180/169 |

FOREIGN PATENT DOCUMENTS

DE 19848824 5/1999

\* cited by examiner

*Primary Examiner*—Jacques H. Louis-Jacques
*Assistant Examiner*—Brian Broadhead
(74) *Attorney, Agent, or Firm*—Foley & Lardner (57) ABSTRACT

In vehicular velocity controlling apparatus and method for an automotive vehicle, an inter-vehicle distance from the vehicle to a preceding vehicle which is running ahead of the vehicle is detected, a vehicular velocity of the vehicle is detected; a relative velocity of the vehicle to the preceding vehicle is detected, a target inter-vehicle distance is calculated on the basis of detected values of the inter-vehicle distance and of the vehicular velocity, a control response characteristic of an inter-vehicle distance system to the target inter-vehicle distance is determined, an inter-vehicle distance command value based on the target inter-vehicle distance is calculated in accordance with the determined control response characteristic, a target vehicular velocity is calculated on the basis of the inter-vehicle distance command value, and the vehicular velocity is controlled to make the detected value of the vehicular velocity substantially equal to the target vehicular velocity, the control response characteristic being determined in accordance with a correlation in magnitude between the target inter-vehicle distance, the inter-vehicle distance command value, and the detected value of the inter-vehicle distance.

14 Claims, 8 Drawing Sheets

VEHICULAR VELOCITY CONTROLLING APPARATUS AND METHOD TO FOLLOW UP A PRECEDING VEHICLE RUNNING AHEAD OF VEHICLE

BACKGROUND OF THE INVENTION a) Field of the Invention

The present invention relates to vehicular velocity controlling apparatus and method to follow up a preceding vehicle which is running ahead of the vehicle with an appropriate inter-vehicle distance maintained.

b) Description of the Related Art

A vehicular velocity controlling apparatus has been proposed which controls a vehicular velocity of an automotive vehicle to follow up a preceding vehicle which is running ahead of the vehicle.

In the previously proposed vehicular velocity controlling apparatus, both an inter-vehicle distance command value (which corresponds to a target inter-vehicle distance in the previously proposed vehicular velocity controlling apparatus described above) and a target relative velocity are calculated from a target inter-vehicle distance (which corresponds to an inter-vehicle distance command value) using a filter prescribed by a damping factor $\zeta$ and a specific angular frequency $\omega n$, a vehicular velocity command value is calculated on the basis of a detected value of the vehicular velocity, a detected value of the relative velocity, a detected value of the inter-vehicle distance, and the target vehicular velocity, and the vehicular velocity is controlled to follow up the preceding vehicle on the basis of the vehicular velocity command value. The damping factor and the specific angular frequency used by a vehicular velocity command value calculating section are determined by referring to each previously set map (memory table) on the damping factor and the specific angular frequency to be used in an inter-vehicle distance control system according to the deviation between the detected (actual) inter-vehicle distance and the relative velocity of the vehicle to the preceding vehicle by means of a control response characteristic determining section.

SUMMARY OF THE INVENTION

When the maps (two-dimensional arrays) on which a relationship between the damping factor and the specific angular frequency is prepared, each of the maps is scheduled on a presupposition that the preceding vehicle is running at a constant cruise velocity. Hence, a mismatch to the driver's driving sense would occur when the preceding vehicle is decelerated to make a stop.

In a case where under a condition such that the preceding vehicle is interrupted from another traffic lane to the same traffic lane as the vehicle in front thereof so that the vehicle traps the preceding vehicle at an inter-vehicle distance shorter than the target inter-vehicle distance, a vehicular braking force tends to be weak and the inter-vehicle distance becomes slowly widened since the specific angular frequency and the damping factor are set such that the response to the interruption of the preceding vehicle is delayed so that a slow convergence to the target inter-vehicle distance occurs on the presupposition that the preceding vehicle is running at the constant velocity (at the cruise speed). Hence, the mismatch to the driver's driving sense would occur.

It is, therefore, an object of the present invention to provide vehicular velocity controlling apparatus and method for an automotive vehicle which can achieve an appropriate follow-up run control to make the inter-vehicle distance appropriately equal to the target inter-vehicle distance without occurrence of the mismatch to the driver's driving sense even if the preceding vehicle is decelerated during the follow-up run control or the preceding vehicle is interrupted into the same traffic lane as the vehicle at a shorter inter-vehicle distance than the target inter-vehicle distance.

According to one aspect of the present invention, there is provided a vehicular velocity controlling apparatus for an automotive vehicle, comprising: an inter-vehicle distance detector to detect an inter-vehicle distance from the vehicle to a preceding vehicle which is running ahead of the vehicle; a vehicular velocity detector to detect a vehicular velocity of the vehicle; a relative velocity detector to detect a relative velocity of the vehicle to the preceding vehicle; a target inter-vehicle distance calculating section that calculates a target inter-vehicle distance on the basis of detected values of the inter-vehicle distance and of the vehicular velocity; a control response characteristic determining section that determines a control response characteristic of an inter-vehicle distance system to the target inter-vehicle distance; an inter-vehicle distance command value calculating section that calculates an inter-vehicle distance command value based on the target inter-vehicle distance in accordance with the determined control response characteristic; a target vehicular velocity calculating section that calculates a target vehicular velocity on the basis of the inter-vehicle distance command value; and a vehicular velocity controlling section that controls the vehicular velocity to make the detected value of the vehicular velocity substantially equal to the target vehicular velocity, the control response characteristic determining section determining the control response characteristic in accordance with a correlation in magnitude between the target inter-vehicle distance, the inter-vehicle distance command value, and the detected value of the inter-vehicle distance.

According to another aspect of the present invention, there is provided a vehicular velocity controlling method for an automotive vehicle, comprising: detecting an inter-vehicle distance from the vehicle to a preceding vehicle which is running ahead of the vehicle; detecting a vehicular velocity of the vehicle; detecting a relative velocity of the vehicle to the preceding vehicle; calculating a target inter-vehicle distance on the basis of detected values of the inter-vehicle distance and of the vehicular velocity; determining a control response characteristic of an inter-vehicle distance system to the target inter-vehicle distance; calculating an inter-vehicle distance command value based on the target inter-vehicle distance in accordance with the determined control response characteristic; calculating a target vehicular velocity on the basis of the inter-vehicle distance command value; and controlling the vehicular velocity to make the detected value of the vehicular velocity substantially equal to the target vehicular velocity and wherein the control response characteristic determining step determines the control response characteristic in accordance with a correlation in magnitude based on the target inter-vehicle distance, the inter-vehicle distance command value, and the detected value of the inter-vehicle distance.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1A:
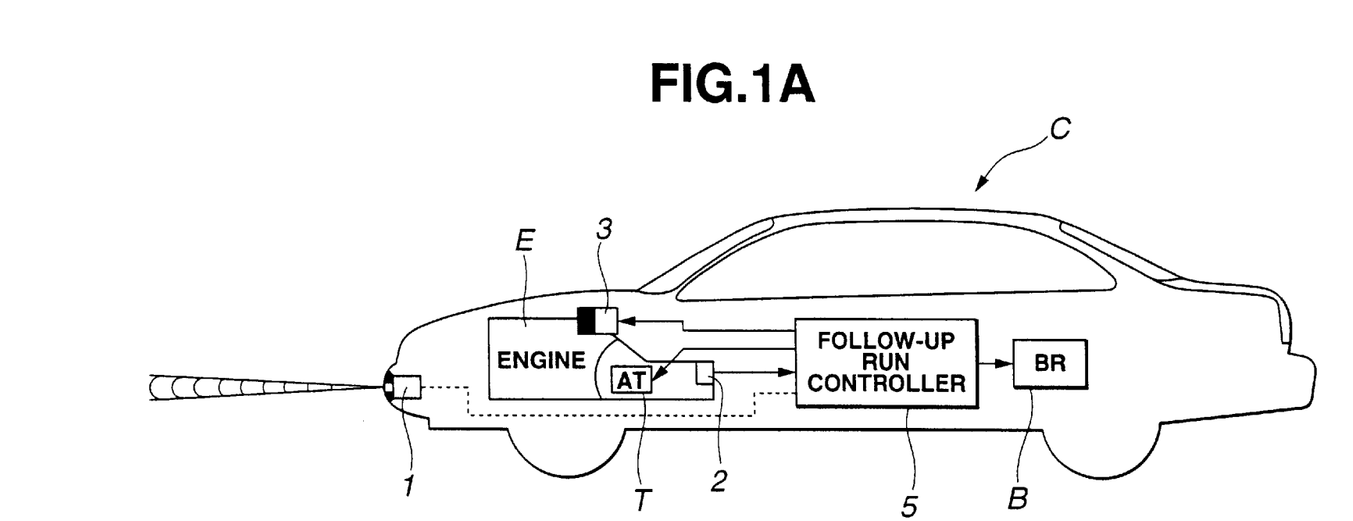
FIG. 1A is a schematic circuit block diagram of a preferred embodiment of a vehicular velocity controlling apparatus applicable to a rear road wheel drive vehicle.

FIG. 1A shows a schematic circuit block diagram of a vehicular velocity controlling apparatus in a preferred embodiment according to the present invention.

In FIG. 1A, C denotes an automotive vehicle in which the vehicular velocity controlling apparatus of the preferred embodiment is mounted. In the vehicle C, a radar unit type inter-vehicle distance sensor 1 (simply, referred to as an inter-vehicle distance sensor) is disposed on a front end of the vehicle C to sweep a laser beam in a front width-wise direction (a front detection zone) of the vehicle C and receives a reflected laser beam from an object (namely, so-called, a preceding vehicle which is running ahead of the vehicle) present in the front width-wise direction. It is noted that the inter-vehicle distance sensor 1 may measure the inter-vehicle distance to the trapped preceding vehicle utilizing an electric wave or ultrasonic wave.

A rotational driving force developed on an engine E (a rotary driving force) is transmitted through an automatic transmission T to drive wheels such as rear road wheels or front road wheels. A gear ratio of the automatic transmission T is controlled according to a vehicular velocity and an engine torque. A vehicular brake system B including a disc brake disposed on each road wheel is installed in the vehicle C.

A vehicular velocity sensor 2 is attached onto an output axle of the automatic transmission (A/T) T. A pulse train signal having a period corresponding to a rotational velocity of the output axle of the automatic transmission T.

In addition, a throttle actuator 3 is disposed in the engine E to actuate an engine throttle valve to be open or closed in accordance with a throttle valve opening angle signal inputted thereto so that an intake air quantity supplied to the engine E is varied to adjust an engine output.

Furthermore, a follow-up run controller 5 controls the throttle actuator 3, the automatic transmission T, and the vehicular brake system B.

The follow-up run controller 5 controls the throttle actuator 3, the automatic transmission T (gear ratio thereof), and the vehicular brake system B on the basis of the inter-vehicle distance L detected by the inter-vehicle distance sensor 1 and the vehicular velocity Vs of the vehicle C detected by the vehicular velocity sensor 2 so that the vehicle C can follow up the preceding vehicle, maintaining an appropriate inter-vehicle distance to the preceding vehicle.

Figure 1B:
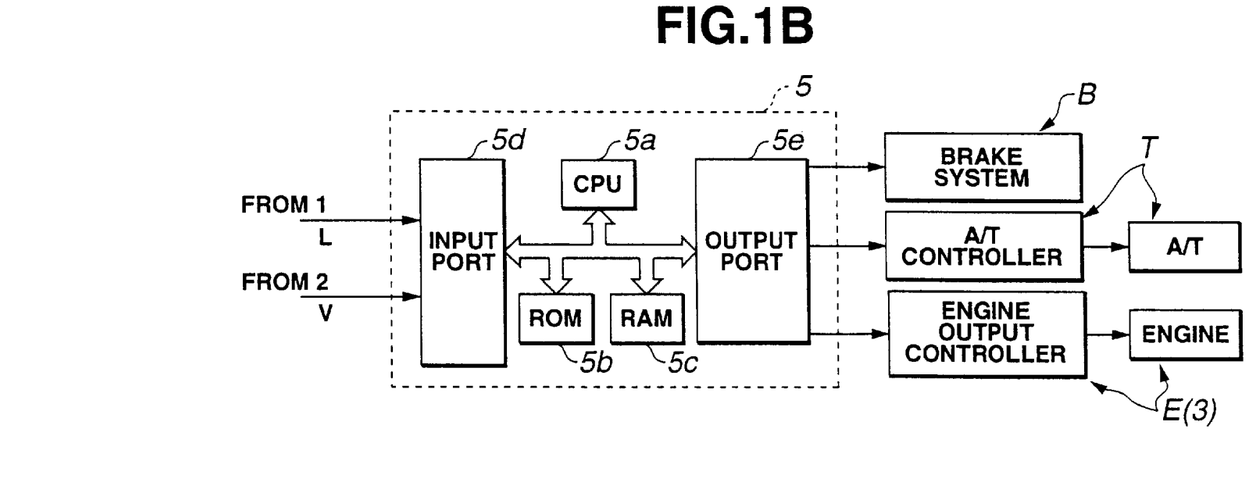
FIG. 1B is a schematic internal circuit block diagram of a follow-up run controller shown in FIG. 1A.

FIG. 1B shows an internal circuit configuration of the follow-up run controller 5 shown in FIG. 1A.

The follow-up run controller 5 includes a microcomputer having a CPU (Central Processing Unit) 5a, a ROM (Read Only Memory) 5b, a RAM (Random Access Memory) 5c, a common bus, an Input Port 5e, and an Output Port 5d. It is noted that a timer is provided in the CPU 5a.

Figure 2:
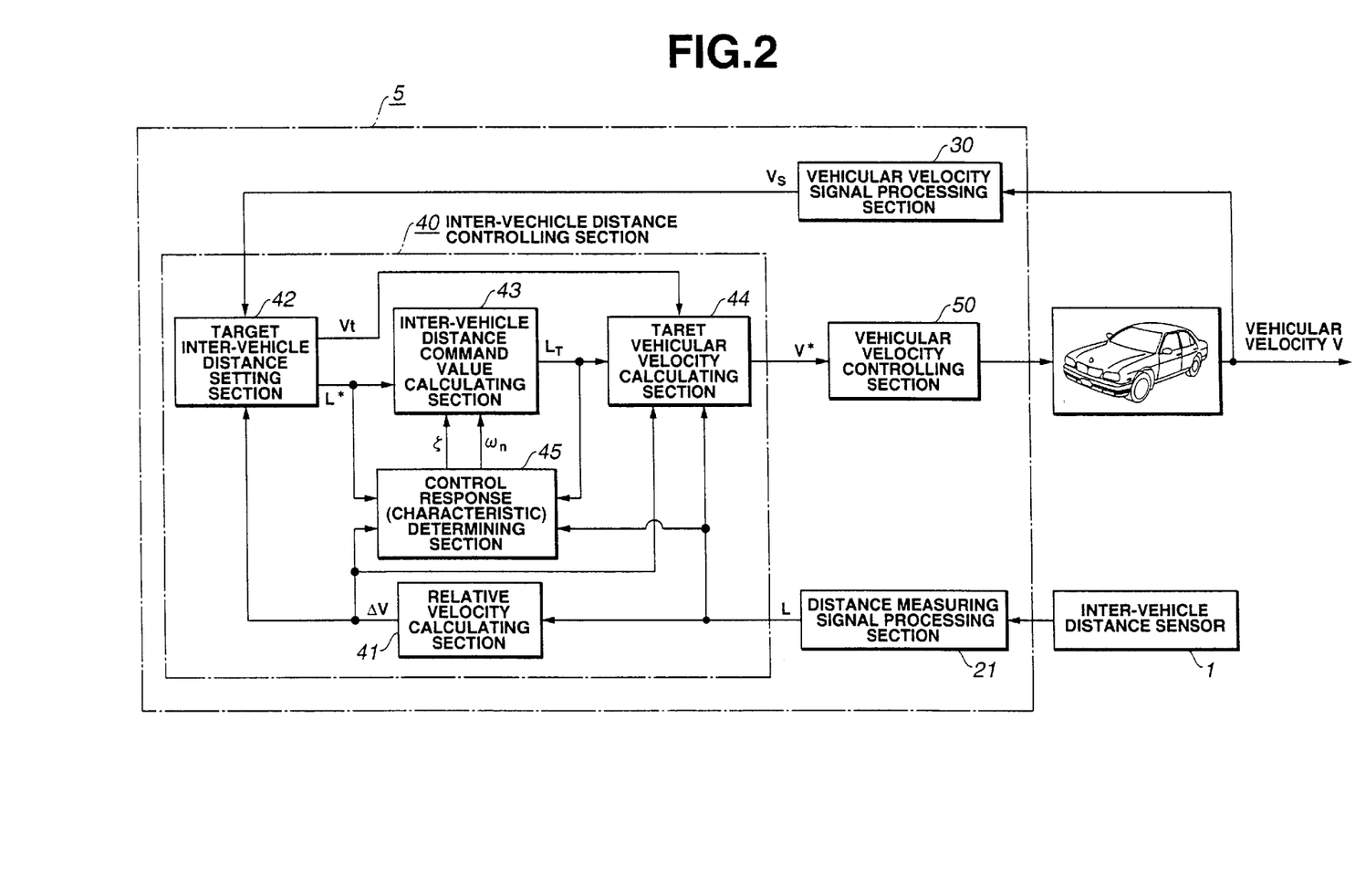
FIG. 2 is a functional circuit block diagram of a specific example of a follow-up run controller shown in FIG. 1B.

FIG. 2 shows a functional circuit block diagram of the vehicular velocity controlling apparatus shown in FIG. 1A.

The follow-up run controller 5 functionally includes: a distance measurement signal processing section 21 that measures a time duration from a time point at which the laser light beam is swept from the inter-vehicle distance sensor 1 to a time point at which the reflected laser light beam is received thereat to calculate the inter-vehicle distance L to the preceding vehicle: a vehicular velocity signal processing section 22 that measures a period of the vehicular velocity indicative pulse train signal from the vehicular velocity sensor 13; a vehicular velocity signal processing section 30 that measures a period of a vehicular velocity pulse train signal to calculate a vehicular velocity Vs; an inter-vehicle distance controlling section 40 that calculates a target value of the vehicular velocity V* to maintain the inter-vehicle distance L at a target value of the inter-vehicle distance L* calculated by the distance measurement signal processing section 21 and the vehicular velocity Vs calculated by the vehicular velocity signal processing section 22; and a vehicular velocity controlling section 50 that controls the vehicular velocity Vs of the vehicle to make the detected value of the vehicular velocity substantially equal to the target value of the vehicular velocity V* by controlling the opening angle of the throttle valve of the engine E through the throttle actuator 3, the gear ratio of the automatic transmission T, and a braking pressure of the vehicular brake system B on the basis of the target value of the vehicular velocity V* and the relative velocity ΔV.

The inter-vehicle distance controlling section 40 includes a relative velocity calculating section 41 that calculates a relative velocity ΔV of the vehicle to the preceding vehicle inputted from the distance measurement signal processing section 20; a target inter-vehicle distance setting section 42 that calculates the target inter-vehicle distance L* between the preceding vehicle and the vehicular velocity on the basis of the vehicular velocity Vs inputted from the vehicular velocity signal processing section 30; an inter-vehicle distance command value calculating section 43 that calculates an inter-vehicle distance command value $L_T$ to make the actual inter-vehicle distance substantially equal to the target inter-vehicle distance L* between the preceding vehicle and the vehicle on the basis of the vehicular velocity Vs inputted from the vehicular velocity signal processing section 30; an inter-vehicle distance command value calculating section 43 that calculates the inter-vehicle distance command value $L_T$ to make the inter-vehicle distance L substantially equal to the target inter-vehicle distance L* through a reference model using a damping factor ζ and a specific angular frequency ωn on the basis of the target inter-vehicle distance L* calculated by the target inter-vehicle distance setting section 42 and the relative velocity ΔV calculated by the relative velocity calculating section 41; a target vehicular velocity calculating section 44 that calculates the target vehicular velocity V* to make the actual inter-vehicle distance L substantially equal to the inter-vehicle distance command value $L_T$ on the basis of the inter-vehicle distance command value $L_T$ calculated by the inter-vehicle distance command value calculating section 43; and a control response determining section that determines the damping factor ζ and the specific angular frequency ωn used in the inter-vehicle distance command value calculating section on the basis of the inter-vehicle distance command value calculating section and the inter-vehicle distance L measured by the distance measurement signal processing section 21.

The relative velocity calculating section 41 is constituted by a band pass filter (BPF) which processes the inputted inter-vehicle distance L in a, e.g., band pass filter.

The band pass filter has its transfer function that can be expressed in the following equation (1).

Since a differential term of a Laplace transform operator s is included in a numerator of the equation (1), the relative velocity ΔV is substantially approximated from the differentiation of the inter-vehicle distance L.

$$F(s)=\omega^2 s/(s^2+2\zeta c\omega c\ s+\omega c) \quad (1).$$

It is noted that ωc=2πc, s denotes a Laplace transform operator, and ζc denotes a damping factor.

As described above, since the band pass filter having the transfer function as given by the equation (1) is used as the relative velocity calculating section 41, the calculation of the relative velocity ΔV described above can avoid such an inconvenience case that is weak in a noise interference and that gives an ill influence on a vehicular dynamic (vehicular behavior) such as fluctuations occur in a vehicular body during the follow-up run control in a case where a simplified differential calculation is carried out from a variation rate of the inter-vehicle distance L so as to calculate the relative velocity ΔV. It is noted that a cut-off frequency fc in the equation (1) is determined according to a magnitude of a noise component included in the inter-vehicle distance L and an allowance value of the vehicular body in a short period of time.

In addition, the calculation of the relative velocity ΔV may alternatively be carried out by a differential process using a high pass filter to the inter-vehicle distance L in place of the band pass filter described above.

In addition, the target inter-vehicle distance setting section 42 calculates the target inter-vehicle distance L* in accordance with the following equation (2) from a vehicular velocity V* of the preceding vehicle (Vt =Vs+ΔV) calculated by an addition of the vehicular velocity Vs to the relative velocity ΔV and at a time duration To (so-called, an inter-vehicle time duration) during which the vehicle has reached to a position Lo (meters) behind the present position of the preceding vehicle.

$$\text{That is to say, } L^*=Vt \times To+Ls \quad (2).$$

Since a concept of the inter-vehicle time duration is introduced into the calculation of the target inter-vehicle distance L*, the target inter-vehicle distance L* is set in such a manner that as the vehicular velocity becomes faster, the inter-vehicle distance becomes large.

In the equation (2), Ls denotes an initial inter-vehicle distance when the vehicle stops.

Furthermore, the inter-vehicle distance calculating section 43 calculates the command value $L_T$ of the inter-vehicle distance on the basis of the actual inter-vehicle distance L, the target inter-vehicle distance L*, and the relative velocity ΔV to follow up the preceding vehicle maintaining the inter-vehicle distance L* in a second lag order form is carried out in accordance with a reference model $G_T(s)$ expressed in the equation of (3) using the damping factor ζ and the specific angular frequency ωn determined for the response characteristic in the inter-vehicle distance system to be the target vehicular velocity so that the inter-vehicle distance command value $V_T$ is calculated.

$$G_T(s)=\omega n^2/(s^2+2\zeta\omega ns+\omega n) \quad (3).$$

Furthermore, the target vehicular velocity calculating section 44 calculates the target vehicular velocity V* using a feedback compensator on the basis of the inputted inter-vehicle distance command value $L_T$.

That is to say, the target relative velocity ΔV* is first calculated, as expressed in the following equation (4), by subtracting a linear connection between a value of a multiplication of a distance control gain fd and a deviation ΔL(L–L*) between the target inter-vehicle distance L* and the actual inter-vehicle distance L and a value of the multiplication of a velocity control gain fv with the relative velocity ΔV from a vehicular velocity of the preceding vehicle Vt of the preceding vehicle.

$$\text{Namely, } \Delta V^*=Vt-\{fd(L_T-L)+fv \cdot \Delta V\} \quad (4).$$

Figure 3:
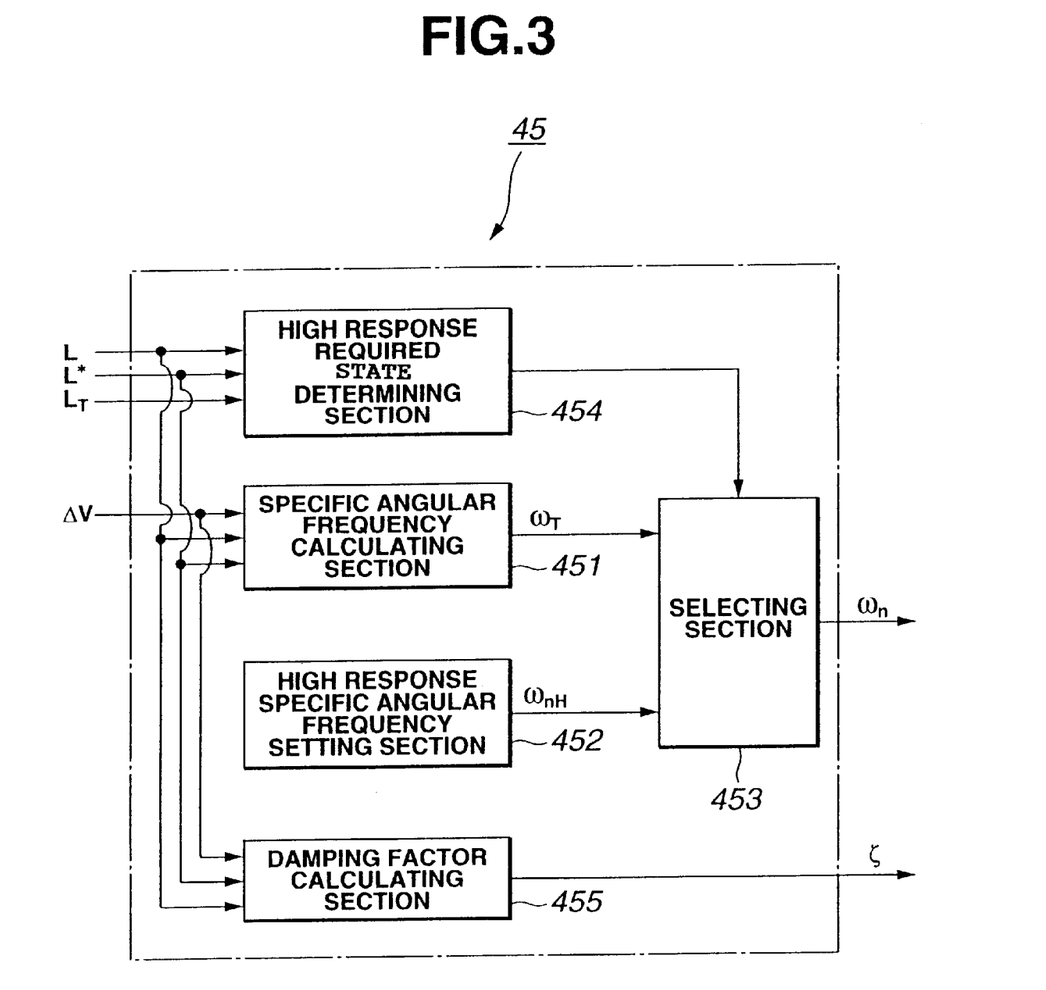
FIG. 3 is a detailed functional block diagram of a control response characteristic determining section shown in FIG. 2.

FIG. 3 shows a detailed functional block diagram of the control response determining section 45 shown in FIG. 2.

The control response determining section 45 includes: a specific angular frequency calculating section 451 that calculates a specific angular frequency by referring to a specific angular frequency calculation map shown in Table 1 as will be described later; a high response purpose specific angular frequency setting section 452 in which a high response purpose specific angular frequency ωnH (for example, ωnH=0.5 radian/second (rad/sec.) larger than each specific angular frequency ωnH set in the specific angular frequency calculation map; a selecting section 453 that selects either one of the specific angular frequency $\omega_T$ calculated at the specific angular frequency calculating section 451 and the high response purpose specific angular frequency ωnH set at the high response specific frequency setting section 452 to supply the selected specific angular frequency as the specific angular frequency to the inter-vehicle distance command value calculating section 43; a high response required determining section 454 that determines if the vehicular running state is in a high response required state from a correlation of a target inter-vehicle distance L*, the inter-vehicle distance command value $L_T$, and the inter-vehicle distance L; and a damping factor calculating section 455 that calculates the value of the damping factor 86 by referring to a damping factor calculation map shown in Table 2 to be described later on the basis of the relative velocity ΔV and the deviation ΔL between the target value of the inter-vehicle distance L* and the detected value of the inter-vehicle distance L and to supply the calculated damping factor to the inter-vehicle distance command value calculating section 43.

The specific angular frequency calculating section 451 calculates the specific angular frequency $\omega_T$ in an inter-vehicle distance control system in accordance with the deviation between the detected and target inter-vehicle distance L* and L and the relative velocity ΔV in order to provide the response characteristic for the actual inter-vehicle distance L to the target value L* of the inter-vehicle distance for the optimum response characteristic in accordance with the deviation ΔL (=L−L*) on the inter-vehicle distance.

Specifically, suppose that the preceding vehicle is running at the constant velocity (cruise run). In this state, the specific angular frequency memory table representing the relationship between the deviation ΔL of the inter-vehicle distance (L−L*), the relative velocity ΔV, and the specific angular frequency $\omega_T$ in the inter-vehicle distance control system as shown in TABLE 1 to provide the optimum inter-vehicle distance control in various preceding vehicle follow-up run states, as shown in TABLE 1, is set to calculate the specific angular frequency $\omega_T$ in the inter-vehicle distance control system by referring to the memory table on the basis of the deviation ΔL on the inter-vehicle distance and the relative velocity ΔV.

As shown in TABLE 1, the specific angular frequency calculation memory table (map) is set and the specific angular frequency $\omega_T$ is calculated by referring to the memory table on the basis of the inter-vehicle distance deviation ΔL and the relative velocity ΔV. The memory table for the specific angular frequency is arrayed in a quadrant form as shown in TABLE 1 such that there are an x-axis along which the inter-vehicle distance deviation ΔL (=L−L*) which indicates zero is taken and a y-axis along which the relative velocity which indicates zero is taken.

In details, two quadrants (II and IV quadrants) in which the inter-vehicle distance deviation ΔL indicates negative value are set to provide the response characteristics for coping with the interruption of the preceding vehicle into the same traffic lane as the vehicle in front thereof and the remaining one of the quadrants (III quadrants) is set to provide the response characteristics for coping with a situation such that the preceding vehicle is far away from the vehicle and becomes separate from the vehicle. As a whole, a plurality of specific angular frequency data $\omega_T$ are set to provide such a response characteristic that the actual inter-vehicle distance L is slowly converged into the target value of the inter-vehicle distance L*.

Even though the magnitude of the relative velocity ΔV is larger in such a situation that the vehicle is approaching to the preceding vehicle but the inter-vehicle distance to the preceding vehicle is so long, an abrupt deceleration is not carried out but it is preferable for the actual inter-vehicle distance to be slowly converged into the target inter-vehicle distance L*.

In such a preceding vehicle follow-up run situation as described above, the actual inter-vehicle distance L provides such a second-order response characteristic that the actual inter-vehicle distance L once overshoots or undershoots the target value of the inter-vehicle distance L* and converges into the target value thereof L*. Such a second-order response characteristic as described above can be achieved by means of the filter based on the equation (3) described above.

The high response characteristic required determining section 454 determines that if $L_T$>L and $L_T$>L*, the present vehicular follow-up run state is the high response required state such as to have a possibility of decelerating the vehicle due to a preceding vehicle motion to stop the preceding vehicle itself. If, on the other hand, L*>$L_T$>L, the high response required determining section 454 determines that the present vehicular follow-up run state is the high response required state such that the preceding vehicle has interrupted from the traffic lane to the same traffic lane as the vehicle at a shorter inter-vehicle distance than the target value of the inter-vehicle distance L*. If the high response required characteristic determining section 454 determines such a high response required state as described above, a selection signal SS having, for example, a logical value of "1" is supplied to the selecting section 453. In any other follow-up run situations, the selection signal SS having the logical value of "0" is supplied to the selecting section 453. The selecting section 453 selects the high response purpose specific angular frequency ωnH set by the high response purpose specific angular frequency setting section 452 when the selection signal SS has the logical value of "1". When the selection signal SS has the logical value of "0", the specific angular frequency calculating section 451 is selected as the specific angular frequency ωn.

Figure 4:
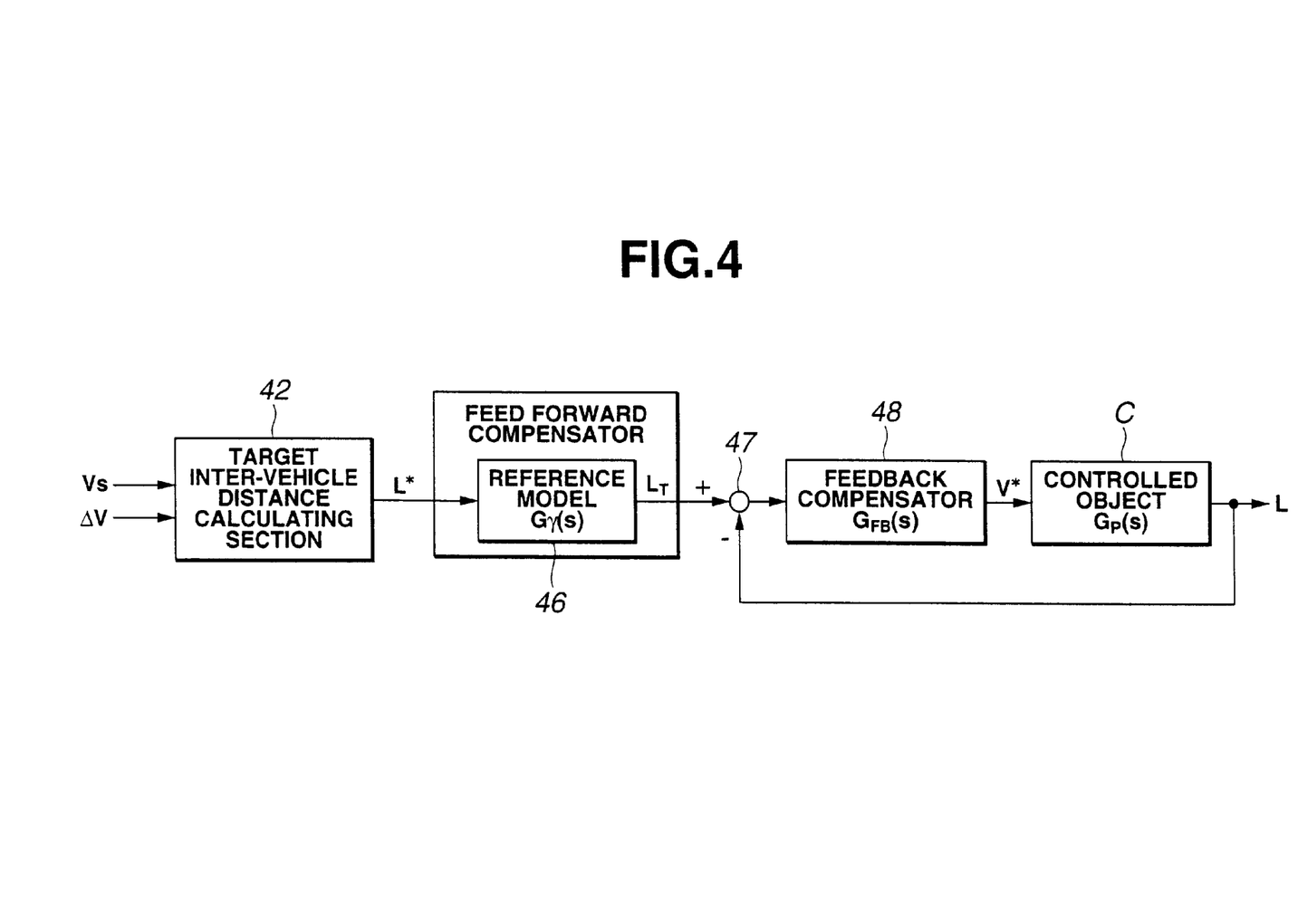
FIG. 4 is a block diagram for explaining a general configuration of an inter-vehicle distance control system.

Furthermore, the damping factor calculation section 455 refers to the damping factor calculation memory table shown in TABLE 2 in which the damping factor data in the inter-vehicle distance control system shown in FIG. 4 are arrayed in the quadrant form in the same manner as the angular frequency response memory table in order that the response characteristic of the inter-vehicle distance control system for the actual inter-vehicle distance L to reach to the target inter-vehicle distance L* gives an optimum characteristic in accordance with the inter-vehicle distance deviation ΔL (=L−L*) and the relative velocity ΔV.

FIG. 4 shows a block diagram of the inter-vehicle distance control system.

As shown in FIG. 4, a reference model 46 constituting the feed-forward compensator converts the target inter-vehicle distance L* calculated by the target inter-vehicle distance calculating section 42 into the inter-vehicle distance command value $L_T$.

A subtractor 47 subtracts the actual inter-vehicle distance L from the inter-vehicle distance command value LT. This deviation ΔL is converted into the target vehicular velocity V* by means of a feedback compensator 48 to control a controlled object 48 to control the controlled object C.

Figure 5:
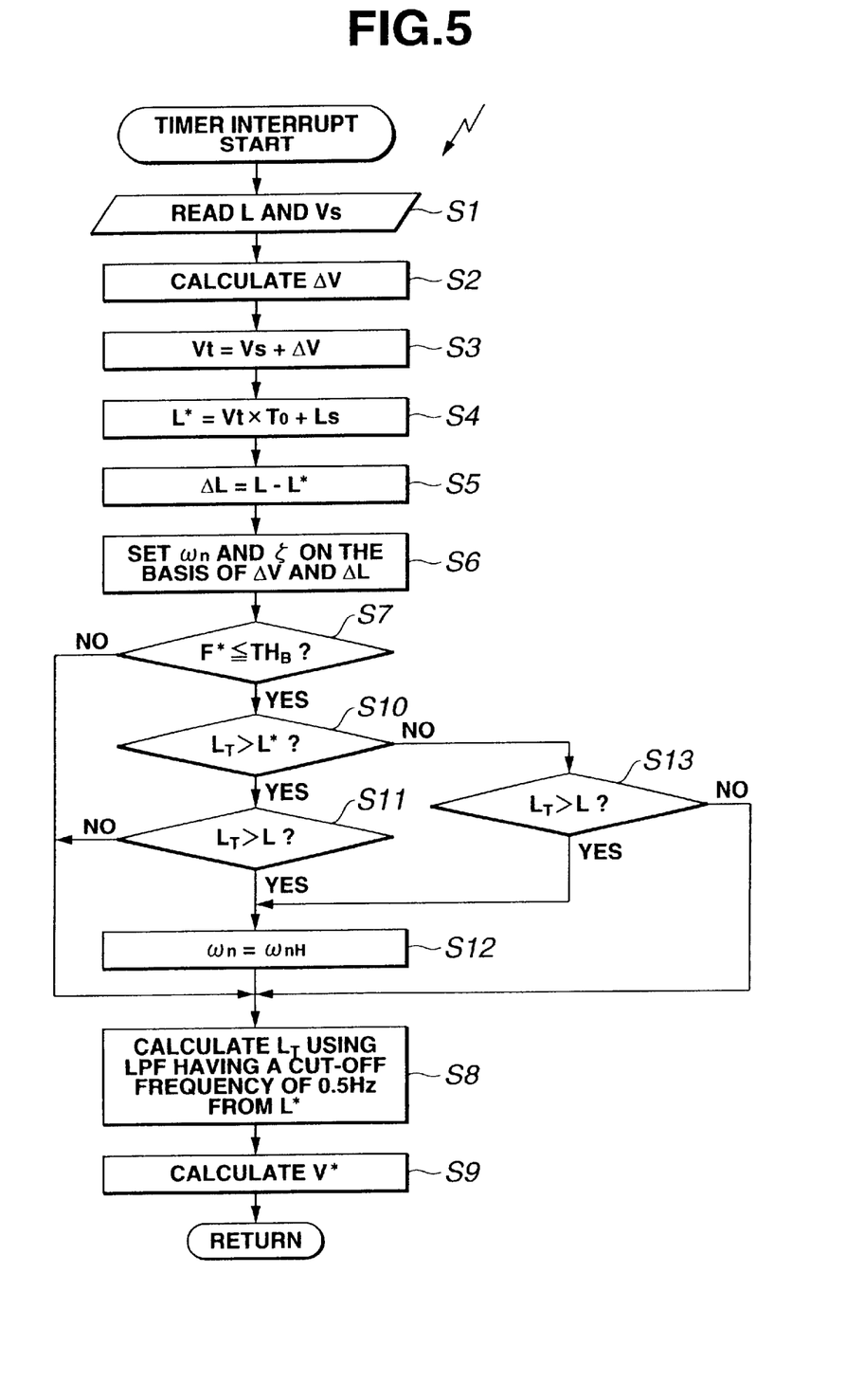
FIG. 5 is an operational flowchart for explaining an example of an inter-vehicle distance control procedure executed in an inter-vehicle distance control system.

FIG. 5 shows an operational flowchart of an inter-vehicle distance control procedure executed in the second preferred embodiment, namely, the follow up run controller shown in FIG. 1B.

The inter-vehicle distance control procedure is executed as a timer interrupt routine, (external interrupt by a timer) for each predetermined period of time (for example, 10 milliseconds) with respect to a main routine (not shown).

At a step S1, the inter-vehicle distance control system, i.e., the follow-up run controller 5 reads the actual inter-vehicle distance L calculated by the distance measurement signal processing section 21 and the vehicular velocity Vs converted by the vehicular velocity processing section 21.

At the next step S2, the inter-vehicle distance control system, i.e., the follow-up run controller 5 performs the band pass filtering based on the equation (1) with respect to the actual inter-vehicle distance L to calculate the relative velocity ΔV and stores it into a relative velocity memory area to update the relative velocity ΔV. Then, the routine goes to a step S3.

At the step S3, the follow-up run controller 5 adds the relative velocity ΔV to the vehicular velocity Vs to derive the vehicular velocity of the preceding vehicle Vt (=Vs+ΔV).

The calculated vehicular velocity of the preceding vehicle Vt is stored into a relative velocity memory area to update the stored value of the relative velocity value.

At the next step S4, the target inter-vehicle distance L* is calculated using the equation (2).

At the next step S5, the target inter-vehicle distance L* calculated at the step S4 and the relative velocity ΔV calculated at the step S2 are read.

The inter-vehicle distance ΔL is calculated by subtracting the target inter-vehicle distance L from the actual inter-vehicle distance L.

At the next step S6, the follow-up run controller 5 refers to the specific angular frequency memory table shown in TABLE 1 and the damping factor calculation memory table shown in TABLE 2 on the basis of the relative velocity ΔV and the inter-vehicle distance deviation ΔL to calculate the specific angular frequency $\omega_T$ and the damping factor ζ. The calculated specific angular frequency $\omega_T$ and the damping factor ζ are stored into predetermined memory areas, respectively, to update them of the specific angular velocity and the damping factor.

Next, at a step S7, the follow-up run controller 5 determines if the preceding vehicle running state is under a predetermined control operation.

At the step S7, the follow-up run controller 5 determines whether the present vehicle is under the braking operation. This determination is based on whether the target driving force F* calculated by the vehicular velocity controlling section 50 is smaller than a negative predetermined braking force threshold value $TH_B$ so that the vehicular brake system B is operated to effect the braking.

If $F^* > TH_B$ (No) at the step S7, the inter-vehicle distance control system determines that the vehicular brake system B is being operated so that the vehicle is not approaching to the preceding vehicle and the routine jumps to a step S8.

At the step S8, the inter-vehicle distance control system performs the filtering in the equation (3) set at, for example, 0.5 Hz of the cut-off frequency band on the specific angular frequency ωn and the damping factor ζ stored in the specific angular frequency memory area and in the damping factor memory area with respect to the target inter-vehicle distance L* using the filtering process of the equation (3) set at, for example, 0.5 Hz to calculate the inter-vehicle distance command value $L_T$.

The calculated inter-vehicle distance command value $L_T$ is stored into an inter-vehicle distance command value memory area to update the stored inter-vehicle distance command value $L_T$ and the present routine goes to a step S9.

At the step S9, the calculation of the equation (4) is performed and the target vehicular velocity V* is calculated to supply the value of V* to the vehicular velocity controlling section 50 and the present routine is ended to return to the main program routine.

On the other hand, if the result of determination at the step S7 indicates $F^* \leq TH_B$ (Yes), the inter-vehicle distance control system determines that the vehicle is approaching to the preceding vehicle and the routine goes to a step S10.

At the step S10, the inter-vehicle distance control system determines whether the inter-vehicle distance command value $L_T$ is in excess of the actual inter-vehicle distance L. If $L_T > L$, the routine goes to a step S11. At the step S11, the inter-vehicle distance control system determines that the present follow-up run state is not high response required state such that there is a possibility of decreasing the preceding vehicle to make a stop and the routine goes to a step S8.

If $L_T > L$, the follow up run controller 5 determines that the present follow-up run state is in the high response required state and the routine goes to a step S12.

The high response purpose specific angular frequency ωnH (=0.5 rad/sec.) is updated into its corresponding specific angular frequency memory area at the step S12 and the routine goes to the step S8.

Furthermore, if the result of determination at the step S10 indicates that $L_T \leq L^*$, the routine goes to the step S13.

At the step S13, the inter-vehicle distance control system determines if the inter-vehicle distance command value $L_T$ is larger than the actual inter-vehicle distance L.

If $L_T > L$ at the step S11, the inter-vehicle distance control system determines that the present follow-up run state is the high response required state in which the preceding vehicle has interrupted from the other traffic lane to the same traffic lane as the vehicle at a shorter inter-vehicle distance than the target inter-vehicle distance L*.

If $L_T \leq L$ at the step S13, the routine goes to the step S8 determining that the present follow-up run state is not the high response required state.

The step S2 corresponds to relative velocity detecting (calculating) means, the step S4 corresponds to target inter-vehicle distance calculating means, the steps S5 through S7 and S10 through S13 correspond to control response determining means, the step S8 corresponds to the inter-vehicle distance command value calculating means, and the step S9 corresponds to the vehicular velocity calculating means.

Furthermore, the vehicular velocity controlling section 50 calculates the driving force command value FoR and the disturbance estimated value dv' to make the target vehicular velocity approximately equal to the vehicular velocity Vs.

The target driving force F* according to these deviations are calculated by means of the vehicular velocity according to these deviations are calculated by means of a vehicular velocity servo system.

The vehicular velocity servo system is exemplified by a U.S. Pat. No. 5,959,572 issued on Sep. 29, 1999, the disclosure of the above-described United States Patent being herein incorporated by reference.

A vehicular velocity servo system using a robust model matching technique constituted by a robust compensator and a generally available feedback control system may be applied to the vehicular velocity servo system.

The vehicular velocity controlling section 50 in the follow-up run controller 5 controls the throttle valve opening angle through the throttle actuator 3, the gear position of the automatic transmission A/T, and the braking force of the vehicular brake system B on the basis of the target driving force (vector variable) F* to make the inter-vehicle distance L substantially equal to the target inter-vehicle distance L* to perform the follow-up run control.

Next, an operation of the vehicular velocity control apparatus according to the present invention will be described below with chief references to FIGS. 6 and 7.

Figure 6:
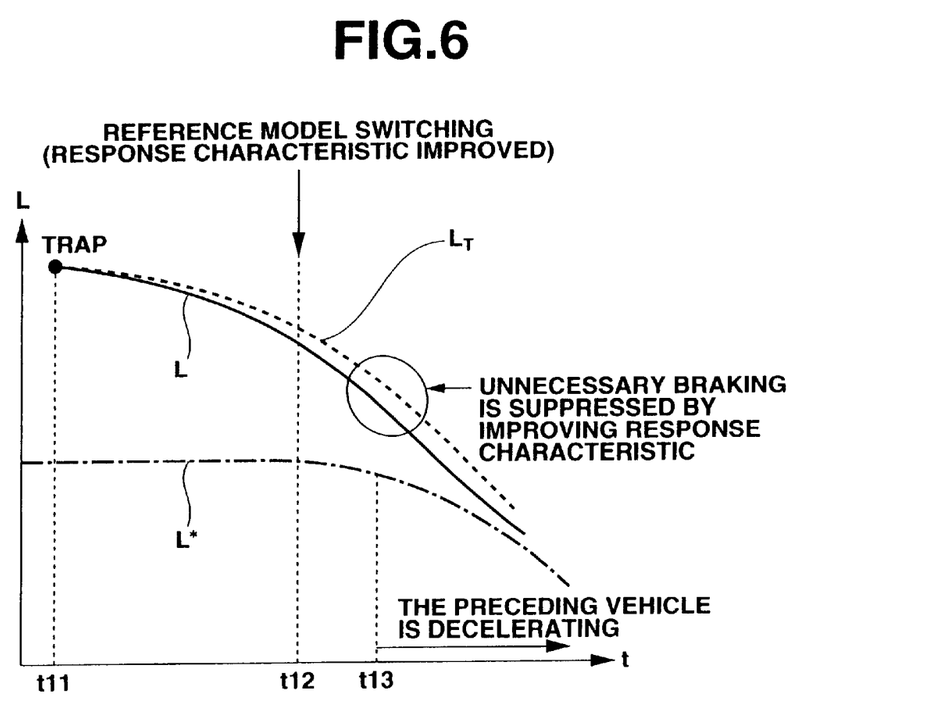
FIG. 6 is a timing chart for explaining a relationship of a preceding vehicle to a time when the vehicle shown in FIG. 1A is approaching to the preceding vehicle at a large relative velocity.

Suppose now that the vehicle is running and maintaining at a constant vehicular velocity (cruise speed) which is the set vehicular velocity $V_{SET}$ by the vehicular driver with no preceding vehicle trapped and, thereafter, at a time point of t11 shown in FIG. 6 the vehicular velocity Vs of the vehicle is increased at a large relative velocity to the preceding vehicle which is running ahead of the vehicle at its constant velocity to catch up the preceding vehicle so that the preceding vehicle is trapped by the inter-vehicle distance sensor 1.

At the time point t11, the actual inter-vehicle distance L to the preceding vehicle is considerably larger (wider) than the target inter-vehicle distance L* denoted by a dot-and-dash line of FIG. 6 and the deviation ΔL of the inter-vehicle distance indicates a positively large value (ΔL=L−L*). In addition, the relative velocity ΔV indicates a negatively large value since the vehicle catches up (approach to) the preceding vehicle.

In this state, in the inter-vehicle distance control procedure shown in FIG. 5, the inter-vehicle distance L* calculated at the step S4 is based on the vehicular velocity Vt of the preceding vehicle so that the target value L* thereof indicates continuously a constant value and the specific angular frequency $\omega_T$ indicates 0.2 radian/sec. at the step S6 and the damping factor $\zeta$ is set to about 0.1 thereat. It is noted that, at this time, the vehicular brake system 13 is under a non-operation state so that the routine shown in FIG. 5 jumps to the step S8 from the step S7 so that the filtering is executed on the basis of the specific angular frequency $\omega_T$ and the damping factor $\zeta$ set at the step S6 to derive the inter-vehicle distance command value $L_T$.

As an initial value, the actual inter-vehicle distance $L_0$ at a time point t11 at which the preceding vehicle is trapped is set. The initial value of $L_0$ is integrated so that the inter-vehicle distance command value $L_T$ provides a slow response characteristic and starts to be decreased at a moderate pace as denoted by a broken line of FIG. 6. Accordingly, the target vehicular velocity V* calculated at the step S9 becomes gradually smaller.

Hence, the target driving force F* calculated by the vehicular velocity controlling section 50 maintains the positive value and is decreased at the moderate pace so that the throttle actuator 3 is controlled to close gradually the throttle valve of the engine E, the vehicular velocity Vs is decreased, and the actual inter-vehicle distance L is moderately decreased as denoted by a solid line of FIG. 6.

During a time duration from the time point t11 to a time point t12, the vehicular brake system B continues with the non-operation state.

In the inter-vehicle distance control procedure of FIG. 5, hence, the inter-vehicle distance command value $L_T$ is continued to be calculated which provides a relatively slow response characteristic on the basis of the specific angular frequency $\omega_T$ and the damping factor $\zeta$ calculated on the basis of TABLE 1 and TABLE 2.

Whereas, if the actual inter-vehicle distance L is reduced with a large response characteristic, the target vehicular velocity V* is reduced in order to make the actual inter-vehicle distance L approach to the inter-vehicle distance command value $L_T$, Therefore, the target driving force F* calculated by the vehicular velocity controlling section 50 is reduced and crosses zero to indicate a negative value at the time point t12. The vehicular brake system B is operated to be transferred to a moderate braking state.

When the vehicle is under the braking state, the routine goes form the step S7 to the step S10 in the timer interrupt routine of FIG. 5. Since, at the time point t12, the inter-vehicle distance command value $L_T$ is larger than the actual inter-vehicle distance L, the inter-vehicle distance control system determines that the present follow-up run state requires the high response characteristic and the routine shown in FIG. 5 goes to the step S12 to store the high response purpose specific angular frequency $\omega$nH into the specific angular frequency memory area as the updated specific angular frequency $\omega$n ($\omega$n←$\omega$nH). Hence, the response characteristic at the filtering executed at the step S8 is improved (or becomes higher (quicker)). Thereby, the calculated inter-vehicle distance command value $L_T$ is started to be decreased at a large gradient so that a quick convergence to the target inter-vehicle distance L* is advanced and, during this time duration, the moderate braking state is continued.

Hence, even though, at a time point t13, the vehicular velocity Vt of the preceding vehicle is started to be decreased to make the stop so that the target inter-vehicle distance L* is reduced at a relatively large decrement variable, the inter-vehicle distance command value $L_T$ is converged toward the target inter-vehicle distance L*.

Therefore, it is not necessary to act upon a strong braking force to make the actual inter-vehicle distance L converge to the inter-vehicle distance and the value $L_T$ due to the remarkable reduction of the actual inter-vehicle distance L to the inter-vehicle distance command value $L_T$. Hence, a stable inter-vehicle distance control can be carried out.

Thereafter, when the actual inter-vehicle distance L is decreased to approach to the target inter-vehicle distance L* and the deviation therebetween ΔL becomes small, the deviation between the target vehicular velocity V* and the vehicular velocity Vs becomes small so that the target driving force F* calculated by the vehicular velocity controlling section 50 is increased toward a vicinity to zero and is in excess of the braking force threshold value $TH_B$. At this time, in the inter-vehicle distance control procedure in FIG. 5, the routine jumps from the step S7 to the step S8. Hence, since the specific angular frequency $\omega_T$ calculated at the step S6 is directly used in the filtering, the response characteristic of the inter-vehicle distance command value $L_T$ provides the original slow response characteristic.

Figure 7:
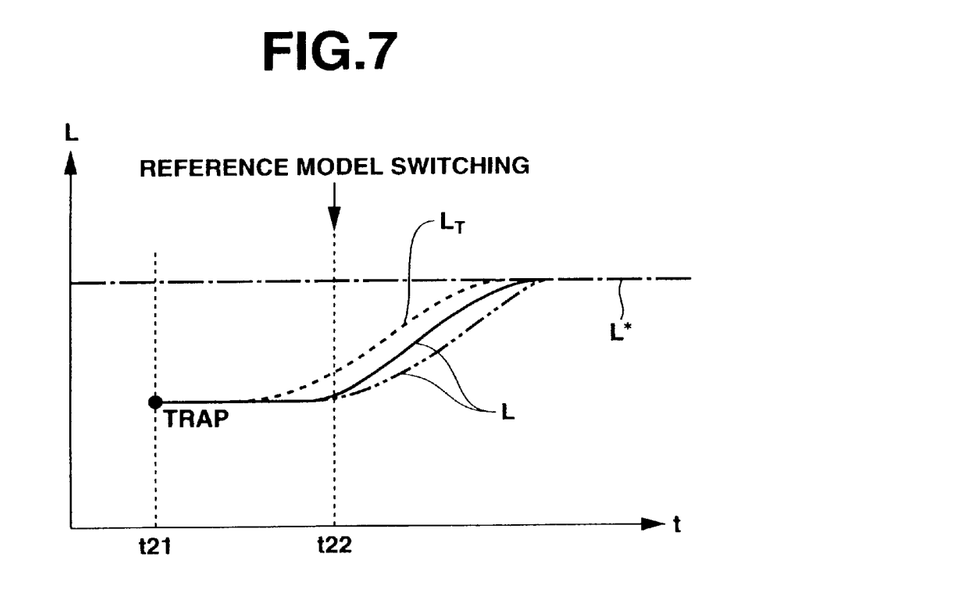
FIG. 7 is a timing chart for explaining an operation of the vehicular velocity controlling apparatus shown in FIG. 1A when the preceding vehicle is interrupted into the same traffic lane at an inter-vehicle distance shorter than the target inter-vehicle distance.

Next, suppose that, as shown in FIG. 7, the vehicle is running at the constant velocity which corresponds to the set vehicular velocity ($V_{SET}$) and, at a time point of t21 in FIG. 7, the preceding vehicle whose relative velocity ΔV is small is interrupted from another traffic lane into the same traffic lane at a shorter inter-vehicle distance than the target inter-vehicle distance L* denoted by the dot-and-dash line of FIG. 7. The initial value of the filtering process at the step S8 in FIG. 5 is set to the actual inter-vehicle distance $L_0$ at the time point t22.

The inter-vehicle distance command value $L_T$ is increased from the initial value $L_0$ with the relatively slow response characteristic, as denoted by the broken line of FIG. 7.

Hence, the decrement variable of the target inter-vehicle distance V* calculated by the vehicular velocity controlling section 50 becomes small. Since the throttle opening angle is controlled in the close direction, the actual inter-vehicle distance L is increased moderately as denoted by the solid line of FIG. 7 but the vehicular brake system B is maintained at the non-operation state.

Thereafter, at a time point of t22 in FIG. 7, the deviation between the inter-vehicle distance command value $L_T$ and the actual inter-vehicle distance L becomes large and the vehicular brake system B is controlled to be moderate braking state. At this time, the routine in FIG. 5 goes from the step S7 to the step S10. Since $L_T \leq L^*$ (No) at the step S10, the routine in FIG. 5 goes to the step S13. Since $L_T > L$ (Yes) at the step S13, the inter-vehicle distance control system, i.e., the follow-up run controller 5 determines that the present follow-up run state is in the high response required state and the routine goes to the step S12.

At the step S12, $\omega$n←$\omega$nH. The filtering process is carried out at the step S8 so that the response characteristic is increased (becomes quicker). Consequently, the inter-vehicle distance command value $L_T$ is increased at a large gradient and the deviation between the inter-vehicle distance command value $L_T$ and the actual inter-vehicle distance L becomes accordingly large. Then, the target driving force F* indicates a negatively large value and the vehicular brake system B is controlled to develop a large braking force. Thus, the actual inter-vehicle distance L becomes speedily converged to the target inter-vehicle distance L*. The inter-vehicle distance control can be carried out without the mismatch to the driver's driving sense.

It is noted that the dot-and-dash line shown in FIG. 7 indicates the actual inter-vehicle distance L in the case where the actual inter-vehicle distance L is slowly increased due to the slow response characteristic in the previously proposed vehicular velocity control apparatus as described in the BACKGROUND OF THE INVENTION.

Thereafter, when the actual inter-vehicle distance L is increased to approach to the target inter-vehicle distance L* and the deviation ΔL becomes small, the deviation between the target vehicular velocity V* and the vehicular velocity Vs becomes small.

The target driving force F* calculated by the vehicular velocity controlling section 50 is increased from the negative value to the vicinity to zero and in excess of the braking force threshold value $TH_B$. At this time, the routine of FIG. 5 jumps from the step S7 to the step S8. Hence, since the specific angular frequency $\omega_T$ calculated at the step S6 is used in the filtering process at the step S8, the response characteristic of the inter-vehicle distance command value $L_T$ provides the original slow response characteristic as described above.

As described above, in the embodiment of the vehicular velocity controlling apparatus according to the present invention, in the case where the vehicle has caught up with the preceding vehicle after no trap against the preceding vehicle and the vehicle is abruptly approaching to the preceding vehicle at the large relative velocity ΔV or in the case where the other vehicle which is not trapped by the inter-vehicle distance sensor 1 is interrupted from the other traffic lane into the front detection zone of the vehicle (namely, into the front portion of the same traffic lane as the vehicle) at a shorter inter-vehicle distance than the target inter-vehicle distance L* to be the preceding vehicle, the follow-up run controller 5, namely, the inter-vehicle distance control system determines that the present follow-up run state is in the high response required state and calculates the inter-vehicle distance command value $L_T$ with the high response characteristic based on the high response purpose specific angular frequency ωnH which is larger than the normally used specific angular frequency data $\omega_T$ shown in TABLE 1. Therefore, in the case where the vehicle is approaching to the preceding vehicle at the relatively large relative velocity ΔV, the deviation between the actual inter-vehicle distance and the inter-vehicle distance command value $L_T$ can be prevented from becoming larger. Consequently, the development of the large braking force can be suppressed. For the interruption of the preceding vehicle into the same traffic lane at the actual inter-vehicle distance L shorter than the target inter-vehicle distance L*, the relatively large braking force is developed so that the quick convergence of the actual inter-vehicle distance L to the target inter-vehicle distance L* can be achieved. Hence, no mismatch to the vehicular driver's driving sense can occur and an optimum follow-up run control to the preceding vehicle can be achieved.

Figure 8:
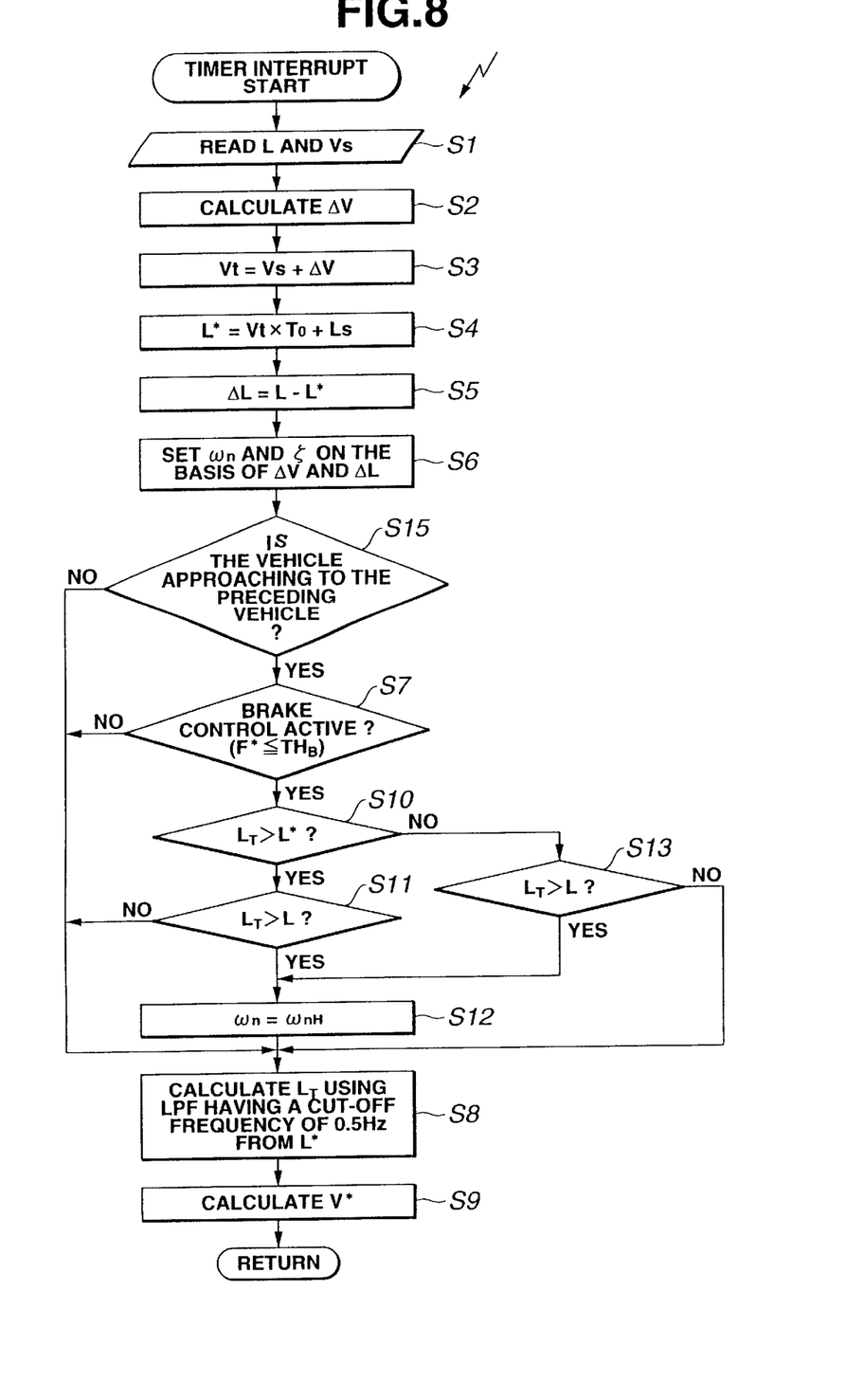
FIG. 8 is a modification of the operational flowchart shown in FIG. 5.

It is noted that, in the inter-vehicle distance control procedure in FIG. 5 of the embodiment, the switching of the response characteristic into the high response characteristic is enabled only when the brake control is carried out. However, as shown in FIG. 8 which is an alternative to the timer interrupt routine of FIG. 5, a step S15 may be interposed between the steps S6 and S7 of FIG. 5 to determine, for example, if the relative velocity ΔV of the vehicle to the preceding vehicle is negative, namely, to determine if the vehicle is approaching to the preceding vehicle. If the vehicle is approaching to the preceding vehicle (Yes) at the step S15, the routine of FIG. 8 may go to the step S7. If the vehicle is not approaching to the preceding vehicle (No) at the step S15, the routine of FIG. 8 may jump to the step S8.

Hence, the response characteristic may become high only when the high response characteristic is truly required (desired).

Figure 9:
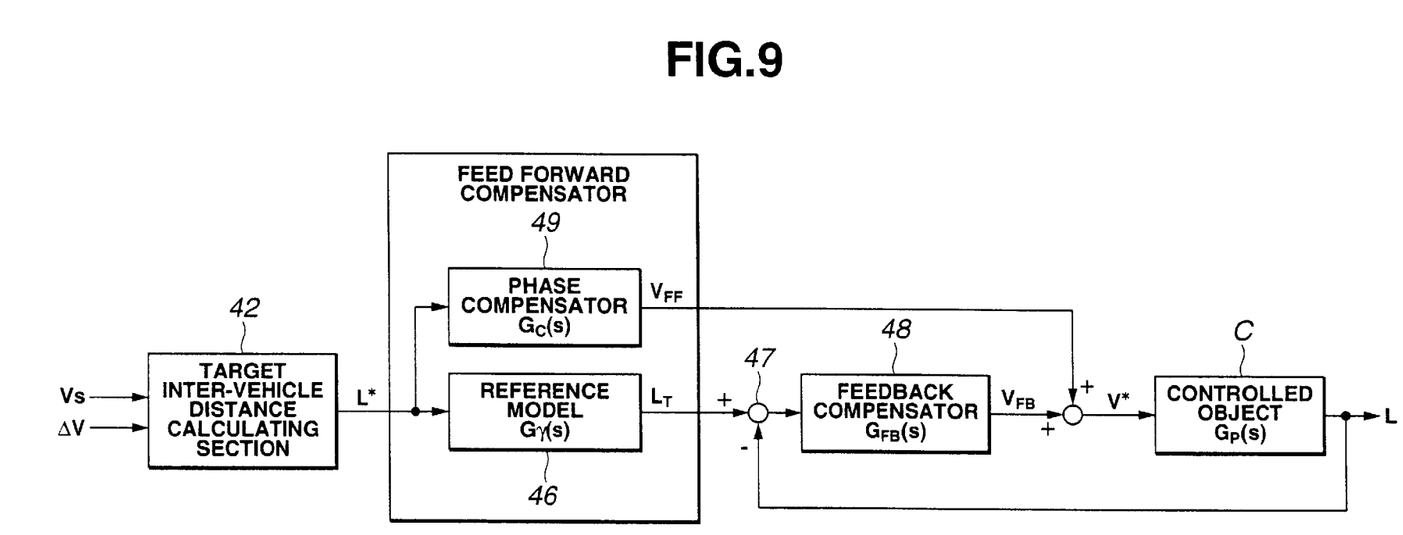
FIG. 9 is a block diagram representing a rough configuration in another example of the inter-vehicle distance control system.

It is also noted that, in the embodiment, only the reference model 46 shown in FIG. 4 constitutes a feed forward compensator in the inter-vehicle distance control system. However, the feed forward compensator may be constituted by the reference model 46 and a phase compensator 49 may calculate a compensated vehicular velocity command value $V_{FF}$ through the filter processing expressed in the following equation (5), the compensated vehicular velocity command value $V_{FF}$ being added to an output $V_{FB}$ of a feed back compensator 48 shown in FIG. 9. In this alternative case, since a magnitude of the decrease in the relative velocity ΔV can be moderate under a long actual inter-vehicle distance state, a smooth follow-up run control can be achieved.

$$Gc(s)=\{\omega ns(s+\omega v)\}/\omega v(s^2+2\zeta\omega ns+\omega n) \qquad (5),$$

wherein ωv denotes the specific angular frequency in the phase compensator 49.

It is also noted that, in the above-described embodiment, the specific angular frequency calculation memory table and the damping factor calculation memory table are used to calculate the specific angular frequency $\omega_T$ and the damping factor ζ. However, these frequency and factor may be calculated from corresponding characteristic equations.

Although, in the above-described embodiment, the follow-up run controller 5 executes the inter-vehicle distance calculating procedure, a hardware of an electronic circuitry such as a combination of function generators, comparators, and arithmetic/logic unit may be applied.

Although, in the embodiment, the present invention is applicable to the rear wheel drive vehicle as shown in FIG. 1A. However, the present invention may alternatively be applied to a front wheel drive vehicle.

Although, in the embodiment, the engine E is applied as the rotary driving source, the present invention may be applied to an electric motor vehicle whose driving source is the electric motor or to a hybrid vehicle whose driving source is the electric motor or the engine.

The entire contents of a Japanese Patent Application No. Heisei 11-168266 (filed in Japan on Jun. 15, 1999) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

TABLE 1

| ΔV | | \-20 | \-16 | \-12 | \-8 | \-4 | 0 | 4 | 8 | 12 | 16 | 20 | 30 | 40 | 60 | 80 | 100 |
|---|---|---|---|---|---|---|---|---|---|---|---|---|---|---|---|---|---|
| km/h | m/s | | | | | | | Array of $\omega_T$ | | | | | | | | | |
| \-101 | \-28 | 0.130 | 0.120 | 0.110 | 0.100 | 0.110 | 0.110 | 0.070 | 0.130 | 0.140 | 0.150 | 0.160 | 0.170 | 0.180 | 0.180 | 0.180 | 0.180 |
| \-86.4 | \-24 | 0.140 | 0.130 | 0.120 | 0.110 | 0.110 | 0.110 | 0.082 | 0.135 | 0.145 | 0.155 | 0.165 | 0.175 | 0.185 | 0.185 | 0.185 | 0.185 |
| \-72 | \-20 | 0.150 | 0.140 | 0.130 | 0.120 | 0.110 | 0.110 | 0.098 | 0.140 | 0.150 | 0.160 | 0.170 | 0.180 | 0.190 | 0.190 | 0.190 | 0.190 |
| \-57.6 | \-16 | 0.160 | 0.150 | 0.140 | 0.130 | 0.120 | 0.110 | 0.105 | 0.145 | 0.155 | 0.165 | 0.175 | 0.185 | 0.195 | 0.195 | 0.195 | 0.195 |
| \-43.2 | \-12 | 0.180 | 0.160 | 0.150 | 0.150 | 0.140 | 0.140 | 0.130 | 0.150 | 0.160 | 0.170 | 0.180 | 0.190 | 0.200 | 0.200 | 0.200 | 0.200 |
| \-36 | \-10 | 0.180 | 0.180 | 0.160 | 0.180 | 0.170 | 0.160 | 0.160 | 0.155 | 0.165 | 0.175 | 0.185 | 0.195 | 0.205 | 0.205 | 0.205 | 0.205 |
| \-28.8 | \-8 | 0.190 | 0.180 | 0.180 | 0.180 | 0.180 | 0.180 | 0.180 | 0.160 | 0.170 | 0.180 | 0.190 | 0.200 | 0.210 | 0.210 | 0.210 | 0.210 |
| \-21.6 | \-6 | 0.200 | 0.190 | 0.180 | 0.180 | 0.180 | 0.180 | 0.180 | 0.165 | 0.175 | 0.185 | 0.195 | 0.205 | 0.215 | 0.215 | 0.215 | 0.215 |
| \-14.4 | \-4 | 0.210 | 0.200 | 0.180 | 0.180 | 0.180 | 0.180 | 0.180 | 0.170 | 0.180 | 0.190 | 0.200 | 0.210 | 0.220 | 0.220 | 0.220 | 0.220 |
| \-10.8 | \-3 | 0.210 | 0.210 | 0.190 | 0.190 | 0.185 | 0.180 | 0.180 | 0.175 | 0.185 | 0.195 | 0.205 | 0.215 | 0.220 | 0.220 | 0.220 | 0.220 |
| \-7.2 | \-2 | 0.220 | 0.210 | 0.200 | 0.200 | 0.180 | 0.180 | 0.180 | 0.180 | 0.190 | 0.200 | 0.210 | 0.220 | 0.220 | 0.220 | 0.220 | 0.220 |
| 0 | 0 | 0.230 | 0.220 | 0.210 | 0.200 | 0.180 | 0.180 | 0.180 | 0.180 | 0.190 | 0.200 | 0.210 | 0.220 | 0.220 | 0.220 | 0.220 | 0.220 |
| 7.2 | 2 | 0.230 | 0.220 | 0.210 | 0.200 | 0.180 | 0.180 | 0.180 | 0.180 | 0.190 | 0.200 | 0.210 | 0.220 | 0.220 | 0.220 | 0.220 | 0.220 |
| 10.8 | 3 | 0.220 | 0.210 | 0.200 | 0.190 | 0.170 | 0.175 | 0.180 | 0.180 | 0.190 | 0.200 | 0.210 | 0.220 | 0.220 | 0.220 | 0.220 | 0.220 |
| 14.4 | 4 | 0.210 | 0.200 | 0.190 | 0.180 | 0.160 | 0.170 | 0.180 | 0.180 | 0.190 | 0.200 | 0.210 | 0.220 | 0.220 | 0.220 | 0.220 | 0.220 |
| 18 | 5 | 0.200 | 0.190 | 0.180 | 0.170 | 0.150 | 0.165 | 0.180 | 0.180 | 0.190 | 0.200 | 0.210 | 0.220 | 0.220 | 0.220 | 0.220 | 0.220 |

Inter-Vehicle Distance Deviation ΔL (=L—L\*)m

TABLE 2

| ΔV | | \-20 | \-16 | \-12 | \-8 | \-4 | 0 | 4 | 8 | 12 | 16 | 20 | 30 | 40 | 60 | 80 | 100 |
|---|---|---|---|---|---|---|---|---|---|---|---|---|---|---|---|---|---|
| km/h | m/s | | | | | | | Array of $\omega_T$ | | | | | | | | | |
| \-101 | \-28 | 0.800 | 0.800 | 0.800 | 0.800 | 0.900 | 0.950 | 0.980 | 0.910 | 0.653 | 0.525 | 0.448 | 0.317 | 0.252 | 0.168 | 0.126 | 0.101 |
| \-86.4 | \-24 | 0.800 | 0.800 | 0.800 | 0.800 | 0.900 | 0.950 | 0.984 | 0.810 | 0.580 | 0.465 | 0.396 | 0.280 | 0.222 | 0.148 | 0.111 | 0.089 |
| \-72 | \-20 | 0.800 | 0.800 | 0.800 | 0.800 | 0.900 | 0.950 | 0.980 | 0.700 | 0.500 | 0.400 | 0.340 | 0.240 | 0.190 | 0.127 | 0.095 | 0.076 |
| \-57.6 | \-16 | 0.800 | 0.800 | 0.800 | 0.800 | 0.900 | 0.880 | 0.840 | 0.580 | 0.413 | 0.330 | 0.280 | 0.197 | 0.156 | 0.104 | 0.078 | 0.062 |
| \-43.2 | \-12 | 0.800 | 0.800 | 0.800 | 0.800 | 0.900 | 0.720 | 0.780 | 0.450 | 0.320 | 0.255 | 0.216 | 0.152 | 0.120 | 0.080 | 0.060 | 0.048 |
| \-36 | \-10 | 0.700 | 0.700 | 0.750 | 0.800 | 0.800 | 0.750 | 0.800 | 0.388 | 0.275 | 0.219 | 0.185 | 0.130 | 0.103 | 0.068 | 0.051 | 0.041 |
| \-28.8 | \-8 | 0.600 | 0.600 | 0.650 | 0.700 | 0.750 | 0.650 | 0.720 | 0.320 | 0.227 | 0.180 | 0.152 | 0.107 | 0.084 | 0.056 | 0.042 | 0.034 |
| \-21.6 | \-6 | 0.500 | 0.500 | 0.550 | 0.600 | 0.650 | 0.550 | 0.540 | 0.248 | 0.175 | 0.139 | 0.117 | 0.082 | 0.065 | 0.043 | 0.032 | 0.026 |
| \-14.4 | \-4 | 0.400 | 0.400 | 0.450 | 0.500 | 0.550 | 0.450 | 0.360 | 0.170 | 0.120 | 0.095 | 0.080 | 0.056 | 0.044 | 0.029 | 0.022 | 0.018 |
| \-10.8 | \-3 | 0.300 | 0.300 | 0.350 | 0.400 | 0.400 | 0.350 | 0.270 | 0.131 | 0.093 | 0.073 | 0.062 | 0.043 | 0.033 | 0.022 | 0.017 | 0.013 |
| \-7.2 | \-2 | 0.200 | 0.200 | 0.250 | 0.300 | 0.300 | 0.250 | 0.180 | 0.090 | 0.063 | 0.050 | 0.042 | 0.029 | 0.022 | 0.015 | 0.011 | 0.009 |
| 0 | 0 | 0.100 | 0.100 | 0.150 | 0.200 | 0.250 | 0.900 | 0.400 | 0.250 | 0.200 | 0.100 | 0.100 | 0.100 | 0.100 | 0.100 | 0.100 | 0.100 |
| 7.2 | 2 | 0.046 | 0.055 | 0.070 | 0.100 | 0.180 | 0.900 | 0.500 | 0.350 | 0.300 | 0.200 | 0.200 | 0.200 | 0.200 | 0.200 | 0.200 | 0.200 |
| 10.8 | 3 | 0.066 | 0.079 | 0.100 | 0.143 | 0.255 | 0.900 | 0.600 | 0.450 | 0.400 | 0.300 | 0.300 | 0.300 | 0.300 | 0.300 | 0.300 | 0.300 |
| 14.4 | 4 | 0.084 | 0.100 | 0.127 | 0.180 | 0.320 | 0.900 | 0.700 | 0.550 | 0.500 | 0.400 | 0.400 | 0.400 | 0.400 | 0.400 | 0.400 | 0.400 |
| 18 | 5 | 0.100 | 0.119 | 0.150 | 0.213 | 0.375 | 0.900 | 0.800 | 0.650 | 0.600 | 0.500 | 0.500 | 0.500 | 0.500 | 0.500 | 0.500 | 0.500 |

Inter-Vehicle Distance Deviation ΔL (=L—L\*)m

What is claimed is:

1. A vehicular velocity controlling apparatus for an automotive vehicle, comprising:

an inter-vehicle distance detector to detect an inter-vehicle distance from the vehicle to a preceding vehicle which is running ahead of the vehicle;

a vehicular velocity detector to detect a vehicular velocity of the vehicle;

a relative velocity detector to detect a relative velocity of the vehicle to the preceding vehicle;

a target inter-vehicle distance calculating section that calculates a target inter-vehicle distance on the basis of detected values of the inter-vehicle distance and of the vehicular velocity;

a control response characteristic determining section that determines a control response characteristic of an inter-vehicle distance system to the target inter-vehicle distance;

an inter-vehicle distance command value calculating section that calculates an inter-vehicle distance command value based on the target inter-vehicle distance in accordance with the determined control response characteristic;

a target vehicular velocity calculating section that calculates a target vehicular velocity on the basis of the inter-vehicle distance command value; and a vehicular velocity controlling section that controls the vehicular velocity to make the detected value of the vehicular velocity substantially equal to the target vehicular velocity, the control response characteristic determining section determining the control response characteristic in accordance with a correlation in magnitude based on the target inter-vehicle distance, the inter-vehicle distance command value, and the detected value of the inter-vehicle distance.

2. A vehicular velocity controlling apparatus for an automotive vehicle as claimed in claim 1, wherein the inter-vehicle distance command value calculating section calculates the inter-vehicle distance command value on the basis of the target inter-vehicle distance using a reference model prescribed by a damping factor and a specific angular frequency and wherein the control response characteristic determining section includes:

a high response required state determining section that determines whether the vehicle is running to follow up the preceding vehicle under a high response required state from the correlation in magnitude between the target inter-vehicle distance, the inter-vehicle distance command value; and the detected value of the inter-vehicle distance; and a selecting section that selects the specific angular frequency from a specific angular frequency memory table representing a relationship between a deviation of the target inter-vehicle distance from the detected value of the inter-vehicle distance, the relative velocity, and the specific angular frequency when the high response characteristic determining section determines that the vehicle is running to follow up the preceding vehicle under no high response required state and that selects a high response purpose specific angular frequency when the high response required state determining section determines that the vehicle is running to follow up the preceding vehicle under the high response required state.

3. A vehicular velocity controlling apparatus for an automotive vehicle as claimed in claim 2, wherein the high response state required section determines that the vehicle is running to follow up the preceding vehicle under the high response required state when the inter-vehicle distance command value is larger than the detected value of the inter-vehicle distance and is larger than the target inter-vehicle distance.

4. A vehicular velocity controlling apparatus for an automotive vehicle as claimed in claim 2, wherein the high response state required section determines that the vehicle is running to follow up the preceding vehicle under the high response required state when the inter-vehicle distance command value is smaller than the target inter-vehicle distance and the detected value of the inter-vehicle distance is smaller than the inter-vehicle distance command value.

5. A vehicular velocity controlling apparatus for an automotive vehicle as claimed in claim 2, wherein the selecting section is enabled to select the high response purpose specific angular frequency only when the vehicle is approaching to the preceding vehicle.

6. A vehicular velocity controlling apparatus for an automotive vehicle as claimed in claim 3, wherein the magnitude of the high response purpose specific angular frequency $\omega_{nH}$ is larger than that of each specific angular frequency data $\omega n$ stored in the specific angular frequency memory table.

7. A vehicular velocity controlling apparatus for an automotive vehicle as claimed in claim 3, wherein the inter-vehicle distance command value calculating section includes a damping factor calculating section that calculates the damping factor e on the basis of the deviation of the target inter-vehicle distance from the detected value of the inter-vehicle distance ($\Delta L = L - L^*$) and the relative velocity $\Delta V$ from a damping factor memory table representing the relationship between the deviation of the target inter-vehicle distance and the detected value of the inter-vehicle distance, and the relative velocity.

8. A vehicular velocity controlling apparatus for an automotive vehicle as claimed in claim 7, wherein the vehicular velocity controlling section includes a vehicular velocity servo system that calculates a driving force command value $F_{OR}$ and a disturbance estimated value dv^to make the detected value of the vehicular velocity Vs substantially equal to the target vehicular velocity V* and calculates a target vehicular driving force F* which is a deviation between the driving force command value $F_{OR}$ and the disturbance estimated value dv^to make the detected value of the vehicular velocity Vs substantially equal to the target vehicular velocity V* and calculates a target vehicular driving force F* which is a deviation between the driving force command value $F_{OR}$ and the disturbance estimated value dv^and wherein the selecting section includes:

a first comparator to compare the target vehicular driving force F* with a braking force threshold value $TH_B$ to determine if $F^* \leq TH_B$;

a second comparator to compare the inter-vehicle distance command value with the target inter-vehicle distance L* to determine if $L_T > L^*$ when the first comparator determines that $F^* \leq TH_B$;

a third comparator to compare the inter-vehicle distance command value $L_T$ with the detected value of the inter-vehicle distance L to determine if $L_T > L$ when the second comparator determines that $L_T > l^*$;

a fourth comparator to compare the inter-vehicle distance command value $L_T$ with the detected value of the inter-vehicle distance L to determine if $L_T > L$ when the second comparator determines that $L_T \leq L^*$; and a setter to set the high response purpose specific angular frequency $\omega n$ ($\omega n \leftarrow \text{unH}$) when the third comparator determines that $L_T > L$ or when the fourth comparator determines that $L_T > L$.

9. A vehicular velocity controlling apparatus for an automotive vehicle as claimed in claim 8, wherein the inter-vehicle distance command value calculating section calculates the target inter-vehicle distance command value $L_T$ on the basis of the high response purpose specific angular frequency $\omega nH$ set by the setter.

10. A vehicular velocity controlling apparatus for an automotive vehicle as claimed in claim 9, wherein the inter-vehicle distance command value calculating section calculates the target inter-vehicle distance command value $L_T$ on the basis of the specific angular frequency when the first comparator determines that $F^* > TH_B$ when the third comparator determines that $L_T \leq L$.

11. A vehicular velocity controlling apparatus for an automotive vehicle as claimed in claim 9, wherein the selecting section further includes a fifth comparator to compare the relative velocity $\Delta V$ with zero to determine if the vehicle is approaching to the preceding vehicle at a negative relative velocity and the setter is enabled to set the high response purpose specific angular frequency as the specific angular frequency ($\omega n = \omega nH$) when the fifth comparator determines that the vehicle is approaching to the preceding vehicle.

12. A vehicular velocity controlling apparatus for an automotive vehicle as claimed in claim 11, wherein the high response purpose angular frequency ùnH is approximately 0.5 radian/sec.

13. A vehicular velocity controlling apparatus for an automotive vehicle, comprising:

inter-vehicle distance detecting means for detecting an inter-vehicle distance from the vehicle to a preceding vehicle which is running ahead of the vehicle;

vehicular velocity detecting means for detecting a vehicular velocity of the vehicle;

relative velocity detecting means for detecting a relative velocity of the vehicle to the preceding vehicle;

target inter-vehicle distance calculating means for calculating a target inter-vehicle distance on the basis of detected values of the inter-vehicle distance and of the vehicular velocity;

control response characteristic determining means for determining a response characteristic of an inter-vehicle distance system to the target inter-vehicle distance;

inter-vehicle distance command value calculating means for calculating an inter-vehicle distance command value based on the target inter-vehicle distance in accordance with the determined control response characteristic;

target vehicular velocity calculating means for calculating a target vehicular velocity on the basis of the inter-vehicle distance command value; and vehicular velocity controlling means for controlling the vehicular velocity to make the detected value of the vehicular velocity substantially equal to the target vehicular velocity, the control response characteristic determining means determining the control response characteristic in accordance with a correlation in magnitude between the target inter-vehicle distance, the inter-vehicle distance command value, and the detected value of the inter-vehicle distance.

14. A vehicular velocity controlling method for an automotive vehicle, comprising:

detecting an inter-vehicle distance from the vehicle to a preceding vehicle which is running ahead of the vehicle;

detecting a vehicular velocity of the vehicle;

detecting a relative velocity of the vehicle to the preceding vehicle;

calculating a target inter-vehicle distance on the basis of detected values of the inter-vehicle distance and of the vehicular velocity;

determining a control response characteristic of an inter-vehicle distance system to the target inter-vehicle distance;

calculating an inter-vehicle distance command value based on the target inter-vehicle distance in accordance with the determined control response characteristic;

calculating a target vehicular velocity on the basis of the inter-vehicle distance command value; and controlling the vehicular velocity to make the detected value of the vehicular velocity substantially equal to the target vehicular velocity and wherein the control response characteristic determining step determines the control response characteristic in accordance with a correlation in magnitude between the target inter-vehicle distance, the inter-vehicle distance command value, and the detected value of the inter-vehicle distance.

* * * * *